US010389614B2

(12) United States Patent
Chakra et al.

(10) Patent No.: US 10,389,614 B2
(45) Date of Patent: Aug. 20, 2019

(54) WEB SITE REACHABILITY MANAGEMENT FOR CONTENT BROWSING

(71) Applicant: International Business Machines Corporation, Armonk, NY (US)

(72) Inventors: Al Chakra, Apex, NC (US); Saurabh Gupta, Nashua, NH (US); James Y. McVea, Chapel Hill, NC (US); Nancy A. Schipon, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 342 days.

(21) Appl. No.: 14/742,804

(22) Filed: Jun. 18, 2015

(65) Prior Publication Data

US 2016/0373332 A1  Dec. 22, 2016

(51) Int. Cl.
| | |
|---|---|
| *G06F 15/16* | (2006.01) |
| *H04L 12/26* | (2006.01) |
| *H04L 12/911* | (2013.01) |
| *G06F 17/30* | (2006.01) |
| *H04L 29/08* | (2006.01) |
| *H04L 29/06* | (2006.01) |

(52) U.S. Cl.
CPC ...... *H04L 43/103* (2013.01); *G06F 17/30861* (2013.01); *H04L 47/746* (2013.01);
(Continued)

(58) Field of Classification Search
CPC ..... G06F 17/00; G06F 9/45558; H04L 67/34; H04L 47/746; H04L 67/00; H04L 67/10;
(Continued)

(56) References Cited

U.S. PATENT DOCUMENTS 6,253,204 B1 * 6/2001 Glass ................ G06F 17/30887
8,639,804 B2  1/2014 Ramanathaiah et al.
(Continued)

OTHER PUBLICATIONS

A. Le, A. Markopoulou and M. Faloutsos, "PhishDef: URL names say it all," 2011 Proceedings IEEE INFOCOM, Shanghai, 2011, pp. 191-195. (Year: 2011).*

(Continued)

*Primary Examiner* — Oscar A Louie
*Assistant Examiner* — Messeret F Gebre
(74) *Attorney, Agent, or Firm* — Steven M. Greenberg; Shutts & Bowen LLP

(57) ABSTRACT

Embodiments of the invention provide for Web site reachability management in content browsing. A method of the invention includes monitoring different requests for different resources at respectively different resource location addresses initiating from different content browsers of different end users. Different responses to ones of the different requests that include an error code indicating an inability to provide a requested one of the different resources are detected and ones of the resource location addresses associated with corresponding ones of the different responses that include the error code are stored in a list. Finally, the each of resource location addresses are polled to determine whether or not a corresponding one of the resources is able to be retrieved. In response to determining that a resource of a resource location address in the list has become retrievable, the address is removed from the list and an associated end user notified.

12 Claims, 1 Drawing Sheet

(52) U.S. Cl.
CPC .............. *H04L 67/00* (2013.01); *H04L 67/10* (2013.01); *H04L 67/101* (2013.01); *H04L 67/18* (2013.01); *H04L 67/22* (2013.01); *H04L 67/42* (2013.01)

(58) Field of Classification Search
CPC ......... H04L 67/18; H04L 67/22; H04L 67/42; H04L 67/101
USPC .................................................. 709/224, 203
See application file for complete search history.

(56) References Cited

U.S. PATENT DOCUMENTS

| | | | |
|---|---|---|---|
| 8,639,806 B2 | 1/2014 | Gawor et al. | |
| 2007/0005542 A1* | 1/2007 | Echeverria | G06N 5/02 |
| | | | 706/47 |
| 2008/0172679 A1* | 7/2008 | Shen | H04L 69/40 |
| | | | 719/318 |
| 2010/0017889 A1 | 1/2010 | Newstadt et al. | |
| 2011/0264757 A1* | 10/2011 | Gawor | H04L 41/026 |
| | | | 709/207 |

OTHER PUBLICATIONS

IEEE Standard for Separable Insulated Connector Systems for Power Distribution Systems above 600 V, in IEEE Std 386-1995 (Revision of IEEE Std 386-1985), vol., No., pp. 1-42, Mar. 15, 2012 (Year: 2012).*
A. Nakamizo, T. Iida, A. Morishima, S. Sugimoto and H. Kitagawa, "A Tool to Compute ReliableWeb Links and Its Applications," 21st International Conference on Data Engineering Workshops (ICDEW'05), Tokyo, Japan, 2005, pp. 1255-1255 (Year: 2005).*

* cited by examiner

WEB SITE REACHABILITY MANAGEMENT FOR CONTENT BROWSING

BACKGROUND OF THE INVENTION

Field of the Invention

The present invention relates to content browsing in the World Wide Web and more particularly to managing unreachable Web sites during content browsing.

Description of the Related Art

The advent of the global Internet has facilitated access to an unimaginable quantity of information to even the most casual end user. Concurrently with the development of the Internet, developers have produced several content retrieval systems, most famously the world wide web (the "Web"). In the Web, just as in other content retrieval systems, content is stored in different content servers and retrieved into a content browser upon specifying a network location of the content within the content browser. Initially unique to the Web, however, was the notion of hyperlinking in which content pages incorporate activatable references—namely hyperlinks—such that the selection of a hyperlink in one content page led to the loading and display in the content browser of the content referenced by the hyperlink.

Content browsing ordinarily involves the end user providing to the content browser a uniform resource locator ("URL") or other identifier for a network accessible resource with which the resource may be retrieved. Thereafter, the content browser issues a request according to the hypertext transfer protocol ("HTTP") to a content server designated by the URL so as to retrieve the resource—typically a Web page. The response to the request that includes the requested resource is then provided by the content server to the content browser so that the content browser can render in the resource for viewing in the content browser. Of note, on occasion, the requested resource cannot be located by the content server. In that instance, according to HTTP a resource not found error code is returned to the content browser.

The basic interaction of the content server and content browser generally presumes that the content server is able to ascertain whether or not a requested resource may be located by the content server. In consequence, the response by the content server can be interpreted by the content browser as to the state of availability of the requested resource. However, it is often the circumstance that network connectivity to the content server lapses inhibiting the ability of the content server to receive the request from the content browser, to provide a response to the request to the content browser or both. It is also often the circumstance that the content server itself may suffer a fault inhibiting its operation. In those circumstances, the content browser only receives notice that the ability to contact the content server is unreachable.

When a content server is reported unreachable, the end user typically is not certain as to the reason the content server cannot be reached. Many possible factors come to play, some of which are localized to the end user. In this regard, the end user often does not know for certain whether the problem lies with the network or the content server, or whether the problem lies with the computer or supporting software of the end user. To facilitate troubleshooting of an unreachable content server, some Web based services exist which allow an end user to test the reachability of a particular content server without regard to the computing infrastructure of the end user. Indeed, such services report the reachability of popular Web sites based upon the queries of the public at large.

BRIEF SUMMARY OF THE INVENTION

Embodiments of the present invention address deficiencies of the art in respect to troubleshooting an unreachable content server and provide a novel and non-obvious method, system and computer program product for Web site reachability management in content browsing. In an embodiment of the invention, a method for Web site reachability management in content browsing includes monitoring different requests for different resources at respectively different resource location addresses initiating from different content browsers of different end users over a computer communications network. The method also includes detecting different responses to ones of the different requests that include an error code indicating an inability to provide a requested one of the different resources and storing in a list ones of the resource location addresses associated with corresponding ones of the different responses that include the error code. Finally, the method includes periodically polling each of resource location addresses to determine whether or not a corresponding one of the resources is able to be retrieved and responding to determining that a resource of a resource location address in the list has become retrievable by removing the resource location address from the list and notifying an associated end user that the resource in the list determined to be retrievable is able to be retrieved by the associated end user.

In one aspect of the embodiment, the error code indicates an unreachability of a content server from which a requested one of the resources cannot be retrieved. In another aspect of the embodiment, the error code indicates an inability to locate a requested one of the resources that cannot be retrieved. In yet another aspect of the embodiment, only ones of the resource location addresses associated with corresponding ones of the different responses that include an error code included in a set of storage rules are stored in the list. Finally, in even yet another aspect of the embodiment, a notification is transmitted to an end user associated with a resource in the list determined to be unretrievable subsequent to a threshold number of attempts during polling to retrieve the unretrievable resource.

In another embodiment of the invention, a content browsing data processing system is configured for Web site reachability management in content browsing. The system includes a host computing system of one or more computers, each with memory and at least one processor. The system also includes a monitoring agent executing in the host computing system. The monitoring agent monitors different requests for different resources at respectively different resource location addresses initiating from different content browsers of different end users over a computer communications network coupled to the host computing system, detects different responses to ones of the different requests that include an error code indicating an inability to provide a requested one of the different resources and, stores in a list ones of the resource location addresses associated with corresponding ones of the different responses that include the error code. The system yet further includes a polling agent executing in the host computing platform. The polling agent periodically polls each of resource location addresses to determine whether or not a corresponding one of the resources is able to be retrieved. Finally, the system includes a notification agent executing in the host computing platform. The notification agent responds to a determination that a resource of a resource location address in the list has become retrievable by removing the resource location address from the list and notifying an associated end user that the resource in the list determined to be retrievable is able to be retrieved by the associated end user.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for Web site reachability management in content browsing. In accordance with an embodiment of the invention, a request by an end user to retrieve a resource from a content server at a resource location address provided in a content browser is detected. A response in the content browser indicating an error condition is detected. Thereafter, the resource location address and an identity of the end user is added to a list of addresses and the addresses in the list are periodically polled to determine whether or not any of the addresses in the list becomes available so as to not return an error code in response to a request to retrieve a resource at a corresponding one of the addresses. When it is determined that the resource is retrievable based upon the polling, a message is transmitted to the end user indicating a reachability of the content server. In this way, the end user can be apprised of the reachability of the content server and the accessibility to the desired resource without requiring the end user to engage in laborious troubleshooting.

Figure 1:
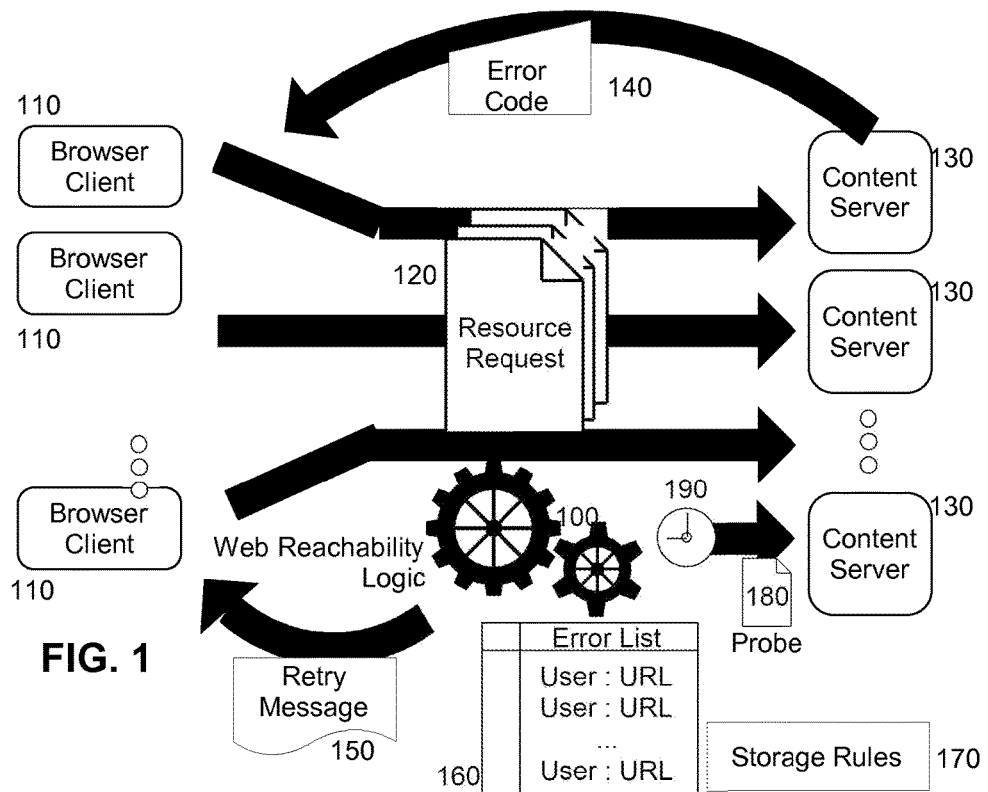
FIG. 1 is a pictorial illustration of a process for Web site reachability management in content browsing.

In further illustration, FIG. 1 pictorially shows a process for Web site reachability management in content browsing. As shown in FIG. 1, different browser clients 110 can issue different requests 120 to access different resources disposed in different content servers 130 accessible at respectively different resource location addresses. Web reachability logic 100 monitors the requests 120 so as to identify those which result in a corresponding one of the content servers 130 returning an error code 140 in a response to a requesting one of the browser clients 110. In response, the Web reachability logic 100 adds an entry to a list 160 a resource location address for each one of the requests 120 resulting in an error code 140 along with a corresponding end user seeking to access a corresponding resource a corresponding one of the content servers 130. Optionally, only selected entries are included in the list 160 depending upon an application of storage rules 170 specifying which types of entries are permitted in the list 160, such as entries relating to resources of a particular type, entries relating to a particular end user, or entries directed to a particular one of the content servers 130.

Of note, the Web reachability logic 100 processes each entry in the list 160 periodically 190 by issuing a probing request 180 for an entry in the list 160 to a corresponding one of the content servers 130 for a particularly requested resource referenced in the entry. In response to successfully accessing the particularly requested resource, a retry message 150 can be provided by the Web reachability logic 100 a browser client 110 of the end user referenced in the entry. Further, the entry thereafter can be removed from the list 160. In this way, the end user gains an awareness of the ability to access the previously inaccessible resource without having been required to manually repeat attempts to access the resource.

Figure 2:
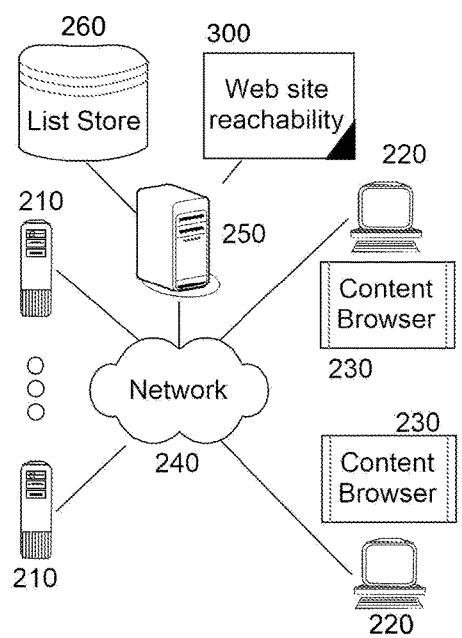
FIG. 2 is a schematic illustration of a content browsing data processing system configured for Web site reachability management in content browsing; and, FIG. 3 is a flow chart illustrating a process for Web site reachability management in content browsing.

The process described in connection with FIG. 1 is implemented in a content browsing data processing system. In yet further illustration, FIG. 2 schematically shows a content browsing data processing system configured for Web site reachability management in content browsing. The system includes a host computing system 250 that includes one or more different computers each with memory and at least one processor. The host computing system 250 is communicatively coupled over a computer communications network 240 to different content browsers 230 in different client computers 220 also communicatively coupled to different content servers 210 from which the content browsers 230 request and receive responses to the requests in connection with the access and retrieval of different resources such as Web pages.

A Web site reachability module 300 is included as part of the system and executes in the memory of the host computing system 250. The Web site reachability module 300 includes program code that when executed, monitors different resource requests from the content browsers 230 and detects when one of the requests results in a corresponding one of the content servers 210 returning an error code. In that instance, the resource location address of the one of the requests is stored as an entry in a list store 260 along with an identity of the end user issuing the one of the requests. The program code when executed additionally processes each entry in the list store 260 by probing a content server associated with a resource location address of the entry. To the extent the probing results in a determination that the resource is able to be accessed, the program code thereafter removes the entry from the list store 260 and sends a status message to an end user stored in the list store 260 as part of the entry.

Figure 3:
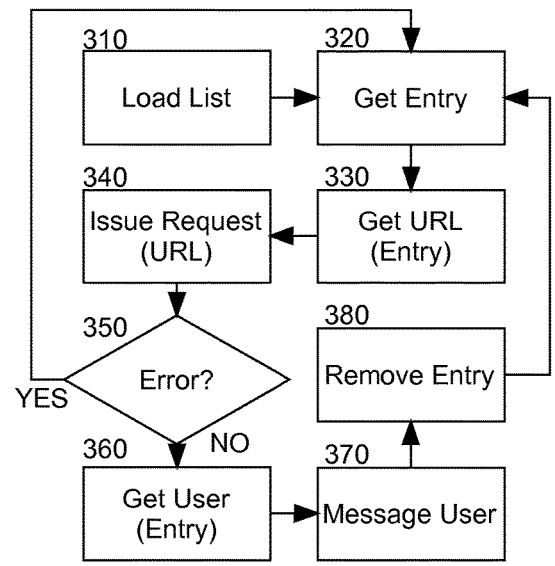

In even yet further illustration of the operation of the Web site reachability module 300, FIG. 3 is a flow chart illustrating a process for Web site reachability management in content browsing. Beginning in block 310, a list of entries associated with resource requests resulting in an error code are loaded into memory and in block 320, a first one of the entries is retrieved for processing. In block 330, a resource location address of the entry is determined and in block 340, a probing request at the resource location address is issued. In decision block 350 it can be determined if the probing request results in an error. If not, in block 360 the end user associated with the entry is determined and in block 370 the end user is messaged with an indication that the resource now can be accessed. Additionally, in block 380 the entry is removed from the list of entries. Thereafter, the process returns to block 320 with the retrieval of the next entry in the list of entries.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for Web site reachability management in content browsing, the method comprising:
   monitoring different requests for different resources at respectively different resource location addresses initiating from different content browsers of different end users over a computer communications network;
   detecting different responses to ones of the different requests that include an error code indicating an inability to provide a requested one of the different resources;
   applying a set of storage rules specifying corresponding error codes and resources of particular type, each of the storage rules permitting storage of only ones of the resource location addresses associated with corresponding ones of the different responses that include a corresponding error code and that relate to a corresponding resource of a particular type;
   responsive to the application of the set of storage rules, storing in a list only ones of the resource location addresses associated with corresponding ones of the different responses that include the error code that is already included in a set of storage rules and that relate to a resource of a particular type and storing with each corresponding one of the resource location addresses a corresponding end user seeking to access the corresponding one of the resource location addresses;
   periodically polling each of resource location addresses in the stored list to determine whether or not a corresponding one of the resources is able to be retrieved; and,
   responsive to determining that a resource of a resource location address in the list has become retrievable, removing the resource location address from the list, identifying a corresponding end user of the resource location address, and notifying the corresponding end user that the resource in the list determined to be retrievable is able to be retrieved.

2. The method of claim 1, wherein the error code indicates an unreachability of a content server from which a requested one of the resources cannot be retrieved.

3. The method of claim 1, wherein the error code indicates an inability to locate a requested one of the resources that cannot be retrieved.

4. The method of claim 1, wherein a notification is transmitted to an end user associated with a resource in the list determined to be unretrievable subsequent to a threshold number of attempts during polling to retrieve the unretrievable resource.

5. A content browsing data processing system configured for Web site reachability management in content browsing, the system comprising:
   a host computing system comprising one or more computers, each with memory and at least one processor;
   a monitoring agent executing in the host computing system, the monitoring agent monitoring different requests for different resources at respectively different resource location addresses initiating from different content browsers of different end users over a computer communications network coupled to the host computing system, detecting different responses to ones of the different requests that include an error code indicating an inability to provide a requested one of the different resources, applying a set of storage rules specifying corresponding error codes and resources of particular type, each of the storage rules permitting storage of only ones of the resource location addresses associated with corresponding ones of the different responses that include a corresponding error code and that relate to a corresponding resource of a particular type, and, responsive to the application of the set of storage rules, storing in a list only ones of the resource location addresses associated with corresponding ones of the different responses that include the error code that is already included in a set of storage rules and that relate to a resource of a particular type and storing with each corresponding one of the resource location addresses a corresponding end user seeking to access the corresponding one of the resource location addresses and storing with each corresponding one of the resource location addresses a corresponding end user seeking to access the corresponding one of the resource location addresses;
   a polling agent executing in the host computing platform, the polling agent periodically polling each of resource location addresses in the stored list to determine whether or not a corresponding one of the resources is able to be retrieved; and,
   a notification agent executing in the host computing platform, the notification agent responding to a determination that a resource of a resource location address in the list has become retrievable by removing the resource location address from the list, identifying a corresponding end user of the resource location address, and notifying the corresponding end user that the resource in the list determined to be retrievable is able to be retrieved.

6. The system of claim 5, wherein the error code indicates an unreachability of a content server from which a requested one of the resources cannot be retrieved.

7. The system of claim 5, wherein the error code indicates an inability to locate a requested one of the resources that cannot be retrieved.

8. The system of claim 5, wherein a notification is transmitted to an end user associated with a resource in the list determined to be unretrievable subsequent to a threshold number of attempts during polling to retrieve the unretrievable resource.

9. A computer program product for Web site reachability management in content browsing, the computer program product comprising a computer readable storage medium having program instructions embodied therewith, wherein the computer readable storage medium is not a transitory signal per se, the program instructions executable by a device to cause the device to perform a method comprising:

monitoring different requests for different resources at respectively different resource location addresses initiating from different content browsers of different end users over a computer communications network;

detecting different responses to ones of the different requests that include an error code indicating an inability to provide a requested one of the different resources;

applying a set of storage rules specifying corresponding error codes and resources of particular type, each of the storage rules permitting storage of only ones of the resource location addresses associated with corresponding ones of the different responses that include a corresponding error code and that relate to a corresponding resource of a particular type;

responsive to the application of the set of storage rules, storing in a list only ones of the resource location addresses associated with corresponding ones of the different responses that include the error code that is already included in a set of storage rules and that relate to a resource of a particular type and storing with each corresponding one of the resource location addresses a corresponding end user seeking to access the corresponding one of the resource location addresses and storing with each corresponding one of the resource location addresses a corresponding end user seeking to access the corresponding one of the resource location addresses;

periodically polling each of resource location addresses in the stored list to determine whether or not a corresponding one of the resources is able to be retrieved; and, responsive to determining that a resource of a resource location address in the list has become retrievable, removing the resource location address from the list, identifying a corresponding end user of the resource location address, and notifying the corresponding end user that the resource in the list determined to be retrievable is able to be retrieved.

10. The computer program product of claim 9, wherein the error code indicates an unreachability of a content server from which a requested one of the resources cannot be retrieved.

11. The computer program product of claim 9, wherein the error code indicates an inability to locate a requested one of the resources that cannot be retrieved.

12. The computer program product of claim 9, wherein a notification is transmitted to an end user associated with a resource in the list determined to be unretrievable subsequent to a threshold number of attempts during polling to retrieve the unretrievable resource.

* * * * *